US012808821B2

(12) United States Patent
Obrzut et al.

(10) Patent No.: US 12,808,821 B2
(45) Date of Patent: Nov. 24, 2026

(54) ANALYTE PROBE AND DETERMINING WATER VAPOR TRANSMISSION RATE

(71) Applicant: Government of the United States of America, as represented by the Secretary of Commerce, Gaithersburg, MD (US)

(72) Inventors: Jan Obrzut, Germantown, MD (US); Randolph Ellis Elmquist, Gaithersburg, MD (US)

(73) Assignee: GOVERNMENT OF THE UNITED STATES OF AMERICA, AS REPRESENTED BY THE SECRETARY OF COMMERCE, Gaithersburg, MD (US)

(*) Notice: Subject to any disclaimer, the term of this patent is extended or adjusted under 35 U.S.C. 154(b) by 215 days.

(21) Appl. No.: 18/711,809

(22) PCT Filed: Nov. 23, 2022

(86) PCT No.: PCT/US2022/050925
§ 371 (c)(1),
(2) Date: May 20, 2024

(87) PCT Pub. No.: WO2023/097017
PCT Pub. Date: Jun. 1, 2023

(65) Prior Publication Data

US 2025/0012739 A1 Jan. 9, 2025

Related U.S. Application Data

(60) Provisional application No. 63/282,203, filed on Nov. 23, 2021.

(51) Int. Cl.
*G01N 22/04* (2006.01)

(52) U.S. Cl.
CPC .................................... *G01N 22/04* (2013.01)

(58) Field of Classification Search
CPC ............................... G01N 22/04; G01N 22/00
(Continued)

(56) References Cited

U.S. PATENT DOCUMENTS 3,843,257 A * 10/1974 Wooten .................. G01N 22/00 356/244
5,191,182 A * 3/1993 Gelorme ................ G01N 22/00 219/709
(Continued)

FOREIGN PATENT DOCUMENTS

EP 3376214 A1 9/2018
WO 2016/149532 A1 9/2016
(Continued)

OTHER PUBLICATIONS

Singh, Sandeep Kumar, et al. "Design of ZnO/N-doped graphene nanohybrid incorporated RF complementary split ring resonator sensor for ammonia gas detection." IEEE Sensors Journal 19.18 (2019): 7968-7975. (Year: 2019).*
(Continued)

*Primary Examiner* — Christopher P McAndrew
(74) *Attorney, Agent, or Firm* — Office of Chief Counsel for National Institute of Standards and Technology

(57) ABSTRACT

An analyte probe determines water vapor transmission rate of a test coating and includes: a graphene analysis layer disposed the substrate and including an analytical interface for receiving a test coating and an n-dopant, such that: the substrate and graphene analysis layer are arranged in analyte sensor; the graphene analysis layer changes microwave frequency input signal to microwave frequency response signal upon being subjected to microwave frequency input signal, wherein the change from microwave frequency input
(Continued)

signal to microwave frequency response signal is directly proportional to the amount of analyte disposed on analytical interface; the analytical interface receives analyte communicated through test coating disposed on analytical interface; and the test coating disposed on analytical interface of graphene analysis layer and comprising a probe surface, such that the test coating has a transmission rate of the analyte to analytical interface determinable by a microwave frequency response from the graphene analysis layer.

13 Claims, 13 Drawing Sheets

(58) Field of Classification Search
USPC .......................................................... 324/639
See application file for complete search history.

(56) References Cited

U.S. PATENT DOCUMENTS 6,150,645 A * 11/2000 Lewis ...................... H05B 6/68 219/715
7,602,193 B1 * 10/2009 Baird ................ G01R 27/2658 324/636
9,576,695 B2 * 2/2017 Yang ........................ H01B 1/04
2010/0112546 A1 * 5/2010 Lieber ................ G01N 33/6854 530/391.1
2015/0355110 A1 * 12/2015 Sappok .................... G01N 1/44 324/639
2017/0212060 A1 * 7/2017 Hao ....................... G01N 22/00
2021/0126581 A1 * 4/2021 Larson ................... G01N 22/00
2021/0255159 A1 * 8/2021 Swager ................ G01N 27/126
2022/0119941 A1 * 4/2022 Eisaman ................. C23C 16/26

FOREIGN PATENT DOCUMENTS

WO 2016/205190 A1 12/2016
WO WO-2020113171 A1 * 6/2020 .............. H10P 95/92

OTHER PUBLICATIONS

Obrzut, J., et al., "Characterization of Graphene Conductance Using a Microwave Cavity", 2018 IEEE 13th Nanotechnology Materials and Devices Conference (NMDC), IEEE, 2018, p. 1-4.
International Search Report from PCT/US2022/050925 file date Nov. 23, 2022.
Łopusiewicz, Ł., et al., "Development and Characterization of Bioactive Poly(butylenesuccinate) Films Modified with Quercetin for Food Packaging Applications", Polymers, 2021, p. 1798, vol. 13.

* cited by examiner determining the Water Vapor transmission Rate (WVTR)with a non-contact microwave resonant cavity apparatus and counting a number of water molecules permeating thru the coating; 221

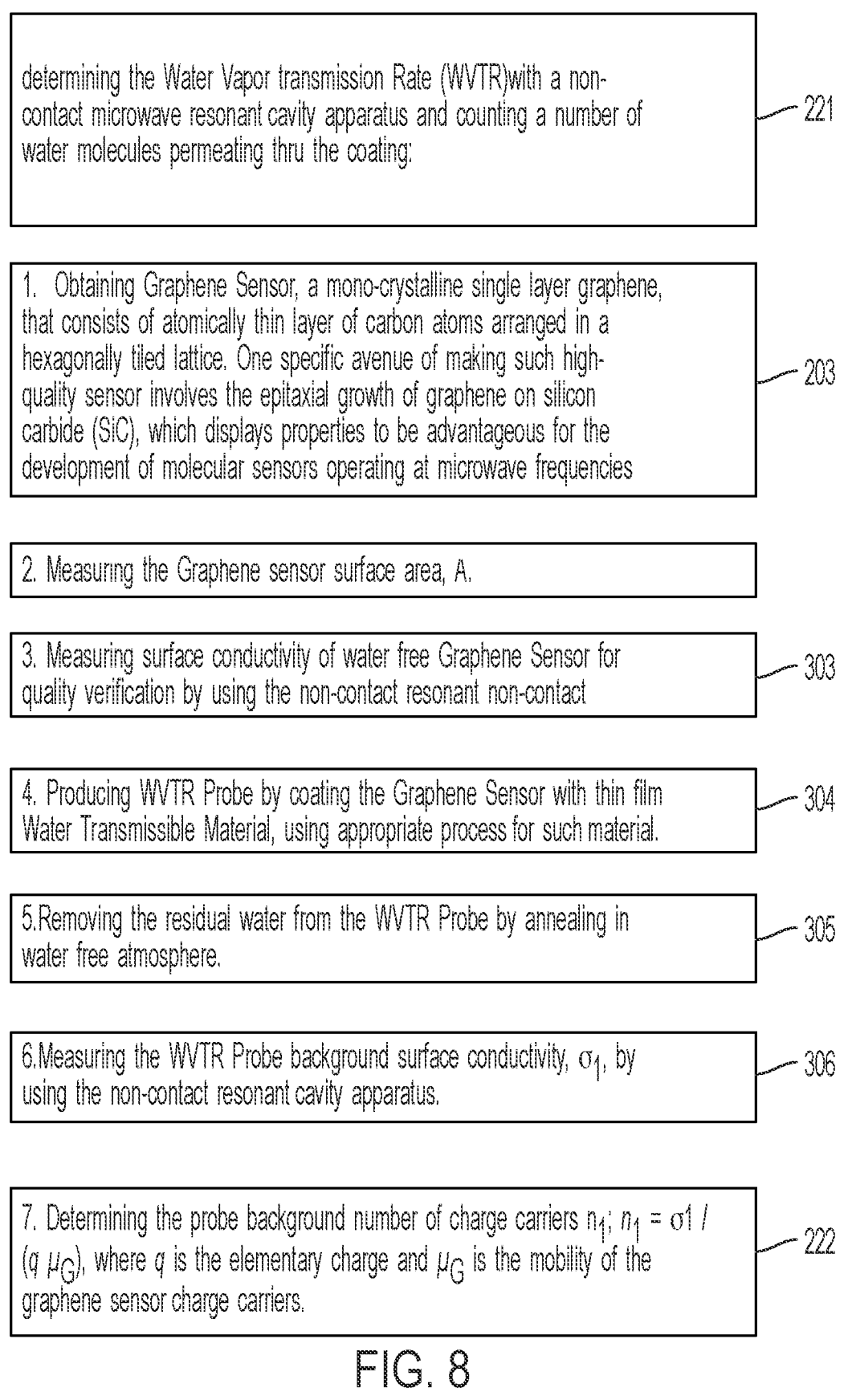

1. Obtaining Graphene Sensor, a mono-crystalline single layer graphene, that consists of atomically thin layer of carbon atoms arranged in a hexagonally tiled lattice. One specific avenue of making such high-quality sensor involves the epitaxial growth of graphene on silicon carbide (SiC), which displays properties to be advantageous for the development of molecular sensors operating at microwave frequencies 203

2. Measuring the Graphene sensor surface area, A.

3. Measuring surface conductivity of water free Graphene Sensor for quality verification by using the non-contact resonant non-contact 303

4. Producing WVTR Probe by coating the Graphene Sensor with thin film Water Transmissible Material, using appropriate process for such material. 304

5.Removing the residual water from the WVTR Probe by annealing in water free atmosphere. 305

6.Measuring the WVTR Probe background surface conductivity, $\sigma_1$, by using the non-contact resonant cavity apparatus. 306

7. Determining the probe background number of charge carriers $n_1$; $n_1 = \sigma 1 / (q\ \mu_G)$, where $q$ is the elementary charge and $\mu_G$ is the mobility of the graphene sensor charge carriers. 222

FIG. 8

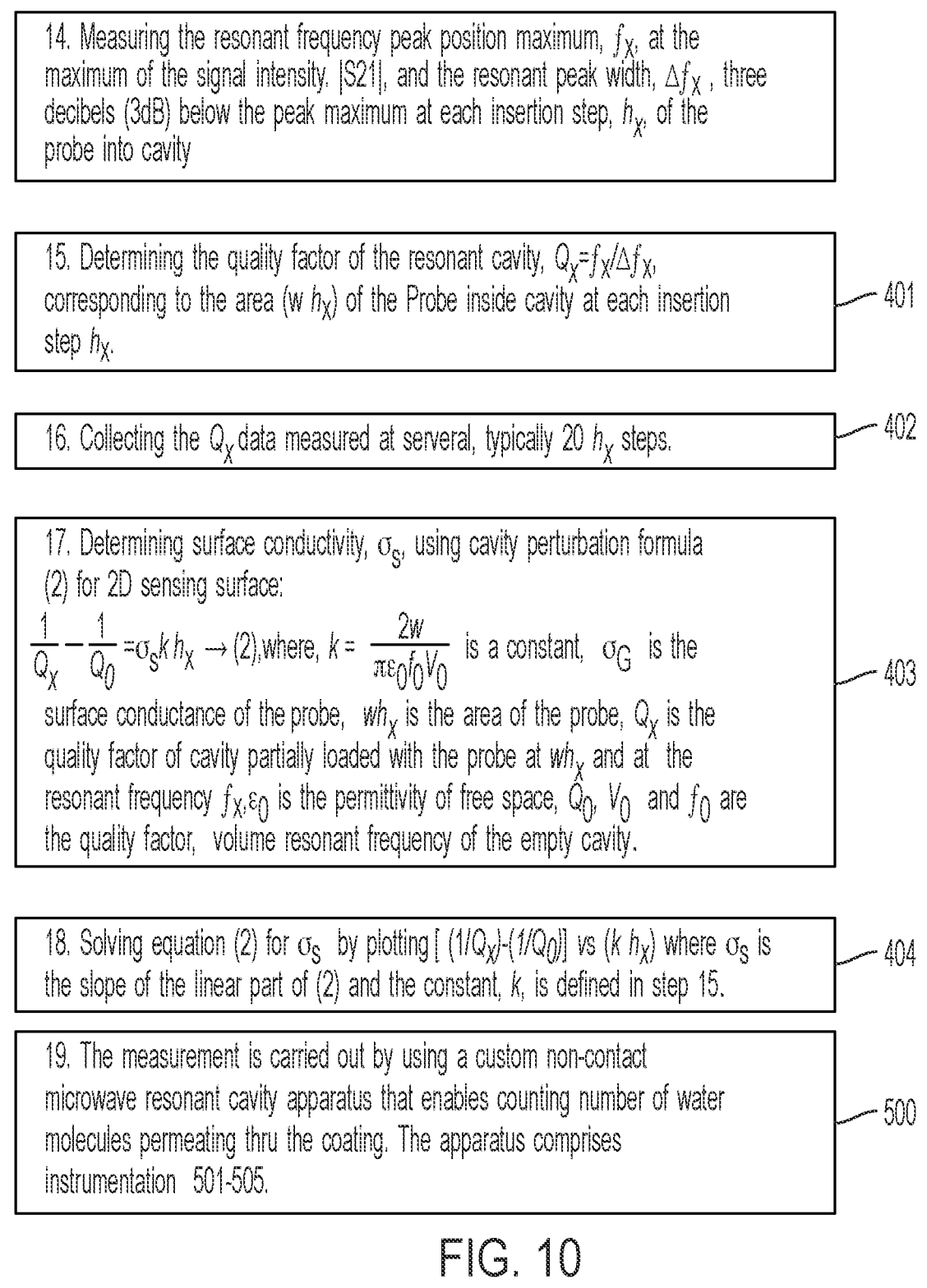

14. Measuring the resonant frequency peak position maximum, $f_X$, at the maximum of the signal intensity, |S21|, and the resonant peak width, $\Delta f_X$, three decibels (3dB) below the peak maximum at each insertion step, $h_X$, of the probe into cavity 15. Determining the quality factor of the resonant cavity, $Q_X = f_X/\Delta f_X$, corresponding to the area (w $h_X$) of the Probe inside cavity at each insertion step $h_X$. — 401

16. Collecting the $Q_X$ data measured at serveral, typically 20 $h_X$ steps. — 402

17. Determining surface conductivity, $\sigma_S$, using cavity perturbation formula (2) for 2D sensing surface:

$$\frac{1}{Q_X} - \frac{1}{Q_0} = \sigma_S k\, h_X \rightarrow (2), \text{where, } k = \frac{2w}{\pi \varepsilon_0 f_0 V_0}$$

is a constant, $\sigma_G$ is the surface conductance of the probe, $wh_X$ is the area of the probe, $Q_X$ is the quality factor of cavity partially loaded with the probe at $wh_X$ and at the resonant frequency $f_X$, $\varepsilon_0$ is the permittivity of free space, $Q_0$, $V_0$ and $f_0$ are the quality factor, volume resonant frequency of the empty cavity. — 403

18. Solving equation (2) for $\sigma_S$ by plotting [ $(1/Q_X)$-$(1/Q_0)$] vs ($k\, h_X$) where $\sigma_S$ is the slope of the linear part of (2) and the constant, $k$, is defined in step 15. — 404

19. The measurement is carried out by using a custom non-contact microwave resonant cavity apparatus that enables counting number of water molecules permeating thru the coating. The apparatus comprises instrumentation 501-505. — 500

FIG. 10

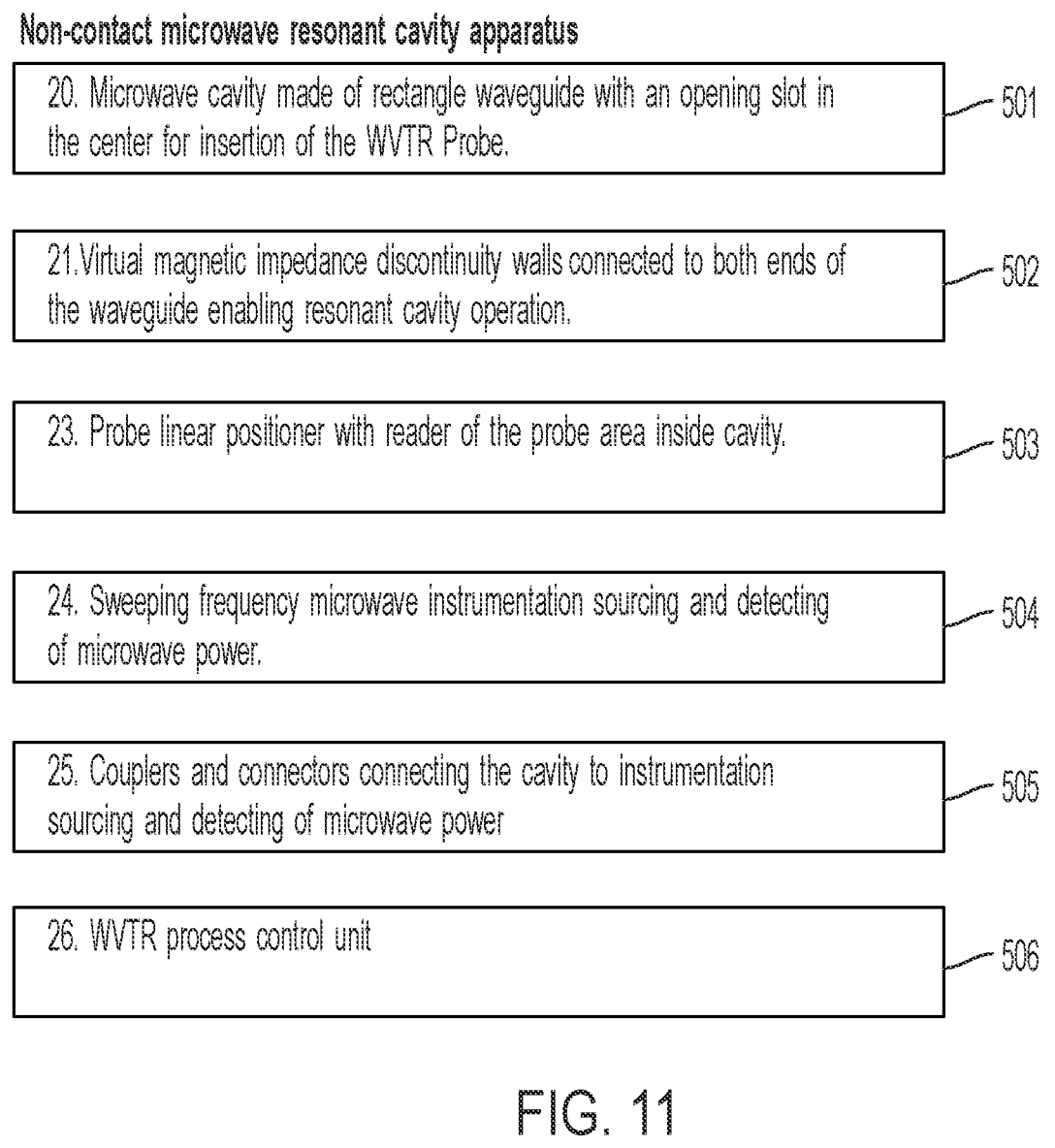

Non-contact microwave resonant cavity apparatus

20. Microwave cavity made of rectangle waveguide with an opening slot in the center for insertion of the WVTR Probe. — 501

21. Virtual magnetic impedance discontinuity walls connected to both ends of the waveguide enabling resonant cavity operation. — 502

23. Probe linear positioner with reader of the probe area inside cavity. — 503

24. Sweeping frequency microwave instrumentation sourcing and detecting of microwave power. — 504

25. Couplers and connectors connecting the cavity to instrumentation sourcing and detecting of microwave power — 505

26. WVTR process control unit — 506

FIG. 11

ANALYTE PROBE AND DETERMINING WATER VAPOR TRANSMISSION RATE

CROSS REFERENCE TO RELATED APPLICATIONS

This application claims the benefit of U.S. Provisional Patent Application Ser. No. 63/282,203 (filed Nov. 23, 2021), which is herein incorporated by reference in its entirety.

STATEMENT REGARDING FEDERALLY SPONSORED RESEARCH

This invention was made with United States Government support from the National Institute of Standards and Technology (NIST), an agency of the United States Department of Commerce. The Government has certain rights in this invention.

BRIEF DESCRIPTION

Disclosed is an analyte probe for determining water vapor transmission rate, analyte probe comprising: a substrate comprising formation surface fora forming graphene analysis layer on substrate; a graphene analysis layer disposed on formation surface of substrate and comprising analytical interface for receiving test coating and an n-dopant, such that: the substrate and graphene analysis layer are arranged in analyte sensor; the graphene analysis layer is n-doped with the n-dopant so that graphene analysis layer communicates charge carriers in response to analyte probe being subjected to microwave frequency input signal, and the communication of charge carriers by graphene analysis layer is directly proportional to an amount of analyte disposed on analytical interface; the graphene analysis layer changes microwave frequency input signal to microwave frequency response signal upon being subjected to microwave frequency input signal, wherein the change from microwave frequency input signal to microwave frequency response signal is directly proportional to the amount of analyte disposed on analytical interface; the analytical interface receives analyte communicated through test coating disposed on analytical interface; and the test coating disposed on analytical interface of graphene analysis layer and comprising probe surface, such that: the graphene analysis layer is interposed between substrate and test coating; the probe surface receives analyte; and the test coating has a transmission rate of analyte through test coating from probe surface to analytical interface that is determinable from microwave frequency input signal and microwave frequency response signal from graphene analysis layer.

Disclosed is a vapor transmission rate analyzer for determining water vapor transmission rate, vapor transmission rate analyzer comprising: a microwave cavity that receives analyte probe; the analyte probe comprising: a substrate comprising formation surface for a forming graphene analysis layer on substrate; a graphene analysis layer disposed on formation surface of substrate and comprising analytical interface for receiving test coating and an n-dopant, such that: the substrate and graphene analysis layer are arranged in analyte sensor; the graphene analysis layer is n-doped with the n-dopant so that graphene analysis layer communicates charge carriers in response to analyte probe being subjected to microwave frequency input signal, and the communication of charge carriers by graphene analysis layer is directly proportional to an amount of analyte disposed on analytical interface; the graphene analysis layer changes microwave frequency input signal to microwave frequency response signal upon being subjected to microwave frequency input signal, wherein the change from microwave frequency input signal to microwave frequency response signal is directly proportional to the amount of analyte disposed on analytical interface; the analytical interface receives analyte communicated through test coating disposed on analytical interface; and the test coating disposed on analytical interface of graphene analysis layer and comprising probe surface, such that: the graphene analysis layer is interposed between substrate and test coating; the probe surface receives analyte; and the test coating has a transmission rate of analyte through test coating from probe surface to analytical interface that is determinable from microwave frequency input signal and microwave frequency response signal from graphene analysis layer; a microwave source in communication with microwave cavity and that produces microwave frequency input signal and communicates microwave frequency input signal to microwave cavity and receives microwave frequency response signal from microwave cavity; a control unit in communication with microwave source, positioner, and analyzer, such that control unit: controls production of microwave frequency input signal by microwave source; controls movement of positioner; produces microwave data from microwave feedback signal received from microwave source; and communicates microwave data to analyzer; the positioner in communication with control unit and analyte probe, such that positioner moves analyte probe relative to microwave cavity and adjusts the position of analyte probe in microwave waveguide of microwave cavity so that a selected portion of analyte probe is subjected to microwave frequency input signal and produces microwave frequency response signal from microwave frequency input signal in microwave waveguide; and the analyzer in communication with control unit and that receives microwave data from control unit and produces water vapor transmission rate from analysis of microwave data.

Disclosed is a process for determining water vapor transmission rate, the process comprising: receiving, by microwave cavity of vapor transmission rate analyzer, analyte probe, analyte probe comprising: a substrate comprising formation surface for a forming graphene analysis layer on substrate; a graphene analysis layer disposed on formation surface of substrate and comprising analytical interface for receiving test coating and an n-dopant, such that: the substrate and graphene analysis layer are arranged in analyte sensor; the graphene analysis layer is n-doped with the n-dopant so that graphene analysis layer communicates charge carriers in response to analyte probe being subjected to microwave frequency input signal, and the communication of charge carriers by graphene analysis layer is directly proportional to an amount of analyte disposed on analytical interface; the graphene analysis layer changes microwave frequency input signal to microwave frequency response signal upon being subjected to microwave frequency input signal, wherein the change from microwave frequency input signal to microwave frequency response signal is directly proportional to the amount of analyte disposed on analytical interface; the analytical interface receives analyte communicated through test coating disposed on analytical interface; and the test coating disposed on analytical interface of graphene analysis layer and comprising probe surface, such that: the graphene analysis layer is interposed between substrate and test coating; and the probe surface receives analyte; and the test coating has a transmission rate of analyte through test coating from probe surface to analytical interface that is determinable from microwave frequency input signal and microwave frequency response signal from graphene analysis layer; subjecting analyte probe to microwave frequency input signal; producing, by analyte probe, microwave frequency response signal from microwave frequency input signal; and analyzing microwave frequency response signal relative to microwave frequency input signal to determine water vapor transmission rate of test coating of the analyte probe.

BRIEF DESCRIPTION OF THE DRAWINGS

The following description cannot be considered limiting in any way. Various objectives, features, and advantages of the disclosed subject matter can be more fully appreciated with reference to the following detailed description of the disclosed subject matter when considered in connection with the following drawings, in which like reference numerals identify like elements.

FIG. 8 steps in determining water vapor transmission rate, according to some embodiments.

FIG. 10 steps in determining water vapor transmission rate, continued from FIG. 9, according to some embodiments.

FIG. 11 steps in determining water vapor transmission rate, continued from FIG. 10, according to some embodiments.

DETAILED DESCRIPTION

Figure 1:
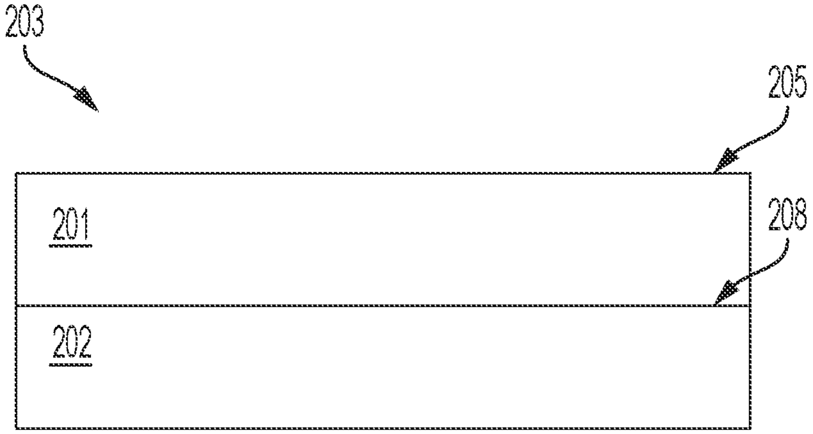
FIG. 1 shows an analyte sensor, according to some embodiments.
Figure 2:
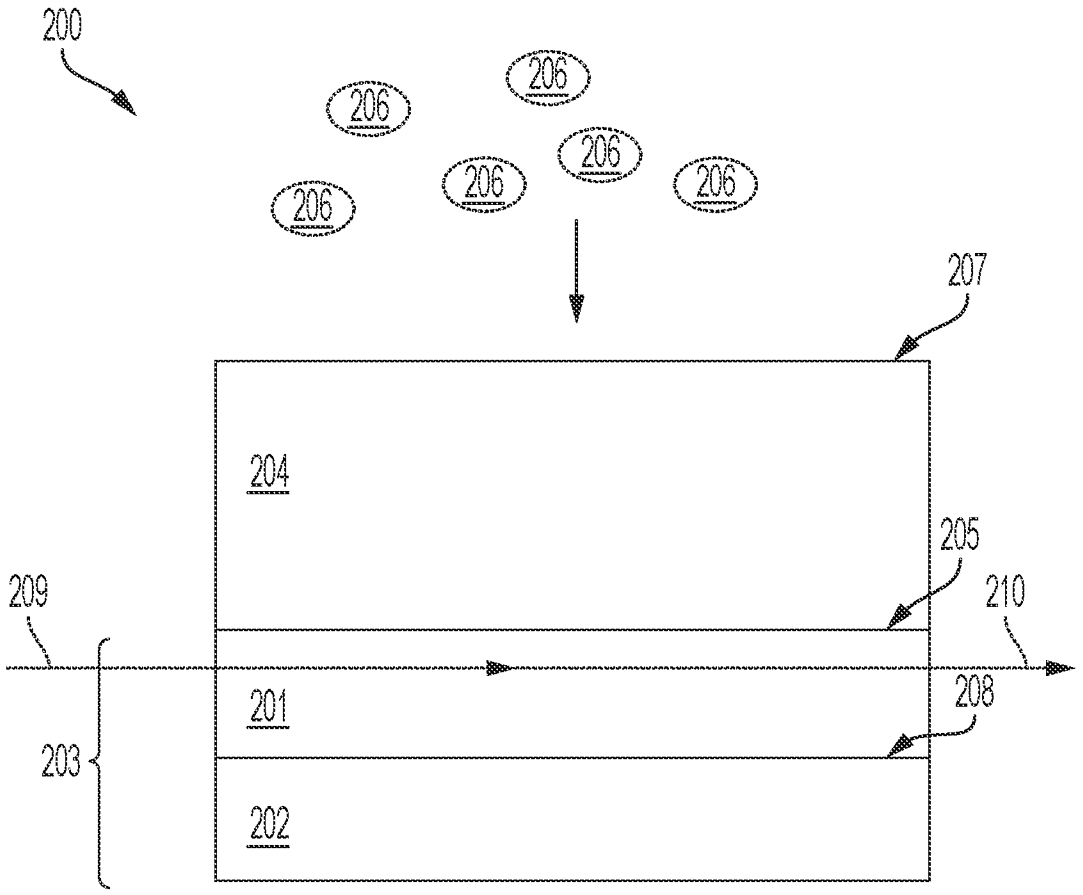
FIG. 2 shows an analyte probe for determining water vapor transmission rate, according to some embodiments.
Figure 3:
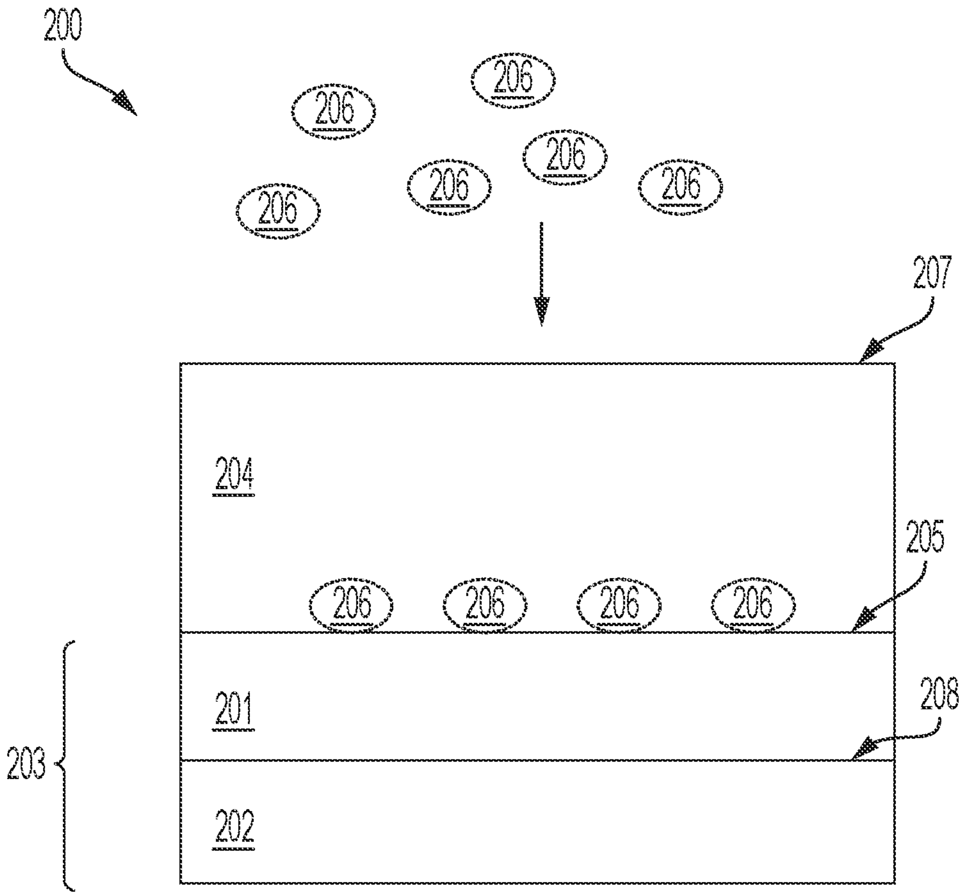
FIG. 3 shows an analyte sensor with analyte disposed on an analytical interface of a graphene analysis layer, according to some embodiments.

A detailed description of one or more embodiments is presented herein by way of exemplification and not limitation.

A technical problem and limiting factor in the service lifetime of nanoscale (2D) electronic and bioelectronic devices is the functional degradation due to the ingress of environmental water. The transport of water into the operational parts of the device is governed by the water permeability of the conformal protective coatings. Other applications require knowledge of materials water transmissibility. In consequence methodology and instrumentation for measuring water permeability/transmissibility of thin (<10 nm) coatings becomes consequential.

In industrial applications, the amount of water transmissibility is typically indicated by the material's water vapor transmission rate (WVTR). The common international unit for the MVTR is $g/m^2/24$ hrs. Conventional ways of measuring VVVTR include gravimetry that measure WVTR by mass within $10^{-2}$ $g/m^2/24$ h and other instrumental techniques that can measure transmission rates in the range of $10^{-5}$ $g/m^2/24$ h. The industry goal for WVTR is $10^{-7}$ $g/m^2/24$ h, wherein conventional techniques have problems. Analyte probe 200, vapor transmission rate analyzer 211 and determining water vapor transmission rate described herein overcome these limitations of conventional technology and measure absolute WVTR as low as $10^{-8}$ $g/m^2/24$ h.

Analyte probe 200, vapor transmission rate analyzer 211 and determining water vapor transmission rate determine the permeability of water vapor passing through test coating 204, e.g., a thin protective layer, disposed on graphene analysis layer 201, which is used as a water sensor (analyte sensor 203). A monolayer epitaxial graphene grown on silicon carbide can be lightly n-type doped, which makes it surface conductivity sensitive to complexation with p-type molecular dopants, such as water in moisturized air. High-resolution non-contact microwave cavity measurements indicate a decrease in surface conductivity of graphene upon complexation with water, due to the depletion of mobile charge carriers. Analyte probe 200, vapor transmission rate analyzer 211 and determining water vapor transmission rate involve this effect to determine the number of graphene charge carriers, $\Delta n$, that are bound with water molecules, and subsequently determination of the number of water molecules permeating the protective coating layer. This can be expressed as water vapor transmission rate 219 (WVTR in $g/m^2/24$ hrs), which is an industrial indicator of protection against moisture penetration.

In an embodiment, with reference to FIG. 1, FIG. 2, FIG. 3, FIG. 4, FIG. 5, FIG. 6, FIG. 7, FIG. 12, and FIG. 13, analyte probe 200 includes: substrate 202 including formation surface 208 for forming a graphene analysis layer 201 on the substrate 202; a graphene analysis layer 201 disposed on the formation surface 208 of the substrate 202 and comprising an analytical interface 205 for receiving a test coating 204 and an n-dopant, such that: the substrate 202 and the graphene analysis layer 201 are arranged in an analyte sensor 203; the graphene analysis layer 201 is n-doped with the n-dopant so that the graphene analysis layer 201 communicates charge carriers in response to the analyte probe 200 being subjected to a microwave frequency input signal 209, and the communication of charge carriers by the graphene analysis layer 201 is directly proportional to an amount of analyte 206 disposed on the analytical interface 205; the graphene analysis layer 201 changes the microwave frequency input signal 209 to microwave frequency response signal 210 upon being subjected to the microwave frequency input signal 209, wherein the change from microwave frequency input signal 209 to microwave frequency response signal 210 is directly proportional to the amount of analyte 206 disposed on the analytical interface 205; the analytical interface 205 receives analyte 206 communicated through a test coating 204 disposed on the analytical interface 205; and the test coating 204 disposed on the analytical interface 205 of the graphene analysis layer 201 and comprising a probe surface 207, such that: the graphene analysis layer 201 is interposed between the substrate 202 and the test coating 204; the probe surface 207 receives analyte 206; and the test coating 204 has a transmission rate of the analyte 206 through the test coating 204 from the probe surface 207 to the analytical interface 205 that is determinable from the microwave frequency input signal 209 and the microwave frequency response signal 210 from the graphene analysis layer 201.

In an embodiment, vapor transmission rate analyzer 211 for determining water vapor transmission rate includes: microwave cavity 212 that receives an analyte probe 200; the analyte probe 200 including: a substrate 202 including a formation surface 208 for a forming a graphene analysis layer 201 on the substrate 202; a graphene analysis layer 201 disposed on the formation surface 208 of the substrate 202 and comprising an analytical interface 205 for receiving a test coating 204 and an n-dopant, such that: the substrate 202 and the graphene analysis layer 201 are arranged in an analyte sensor 203; the graphene analysis layer 201 is n-doped with the n-dopant so that the graphene analysis layer 201 communicates charge carriers in response to the analyte probe 200 being subjected to a microwave frequency input signal 209, and the communication of charge carriers by the graphene analysis layer 201 is directly proportional to an amount of analyte 206 disposed on the analytical interface 205; the graphene analysis layer 201 changes the microwave frequency input signal 209 to microwave frequency response signal 210 upon being subjected to the microwave frequency input signal 209, wherein the change from microwave frequency input signal 209 to microwave frequency response signal 210 is directly proportional to the amount of analyte 206 disposed on the analytical interface 205; the analytical interface 205 receives analyte 206 communicated through a test coating 204 disposed on the analytical interface 205; and the test coating 204 disposed on the analytical interface 205 of the graphene analysis layer 201 and comprising a probe surface 207, such that: the graphene analysis layer 201 is interposed between the substrate 202 and the test coating 204; the probe surface 207 receives analyte 206; and the test coating 204 has a transmission rate of the analyte 206 through the test coating 204 from the probe surface 207 to the analytical interface 205 that is determinable from the microwave frequency input signal 209 and the microwave frequency response signal 210 from the graphene analysis layer 201; a microwave source 216 in communication with the microwave cavity 212 and that produces microwave frequency input signal 209 and communicates the microwave frequency input signal 209 to the microwave cavity 212 and receives the microwave frequency response signal 210 from the microwave cavity 212; a control unit 217 in communication with the microwave source 216, a positioner 218, and an analyzer 220, such that the control unit 217: controls production of microwave frequency input signal 209 by the microwave source 216; controls movement of positioner 218; produces microwave data 228 from microwave feedback signal 225 received from the microwave source 216; and communicates microwave data 228 to the analyzer 220; the positioner 218 in communication with the control unit 217 and the analyte probe 200, such that the positioner 218 moves the analyte probe 200 relative to the microwave cavity 212 and adjusts the position of the analyte probe 200 in a microwave waveguide 213 of the microwave cavity 212 so that a selected portion of the analyte probe 200 is subjected to the microwave frequency input signal 209 and produces the microwave frequency response signal 210 from the microwave frequency input signal 209 in the microwave waveguide 213; and the analyzer 220 in communication with the control unit 217 and that receives the microwave data 228 from the control unit 217 and produces a water vapor transmission rate 219 from analysis of the microwave data 228.

Figure 4:
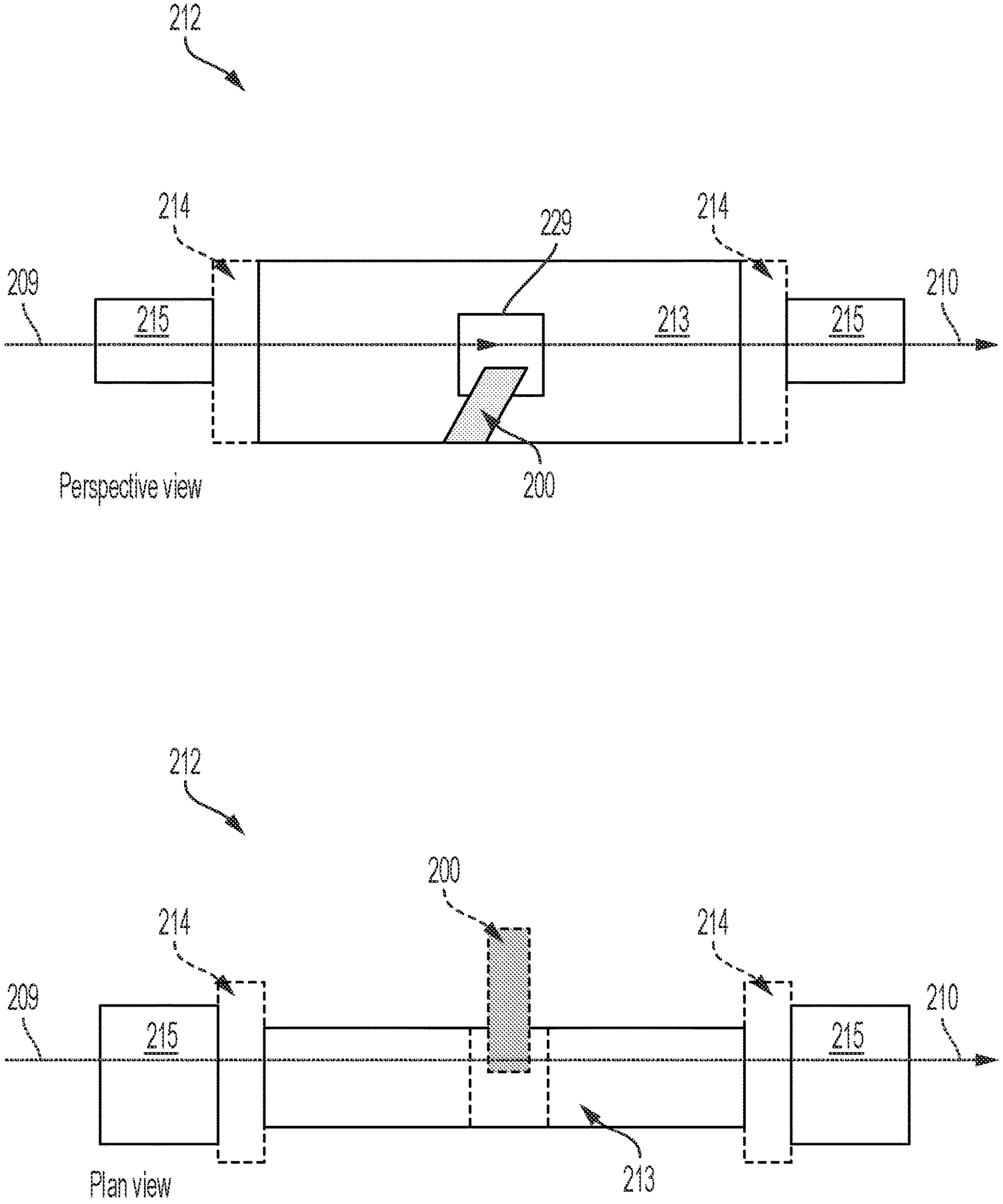
FIG. 4 shows a microwave cavity, according to some embodiments.
Figure 5:
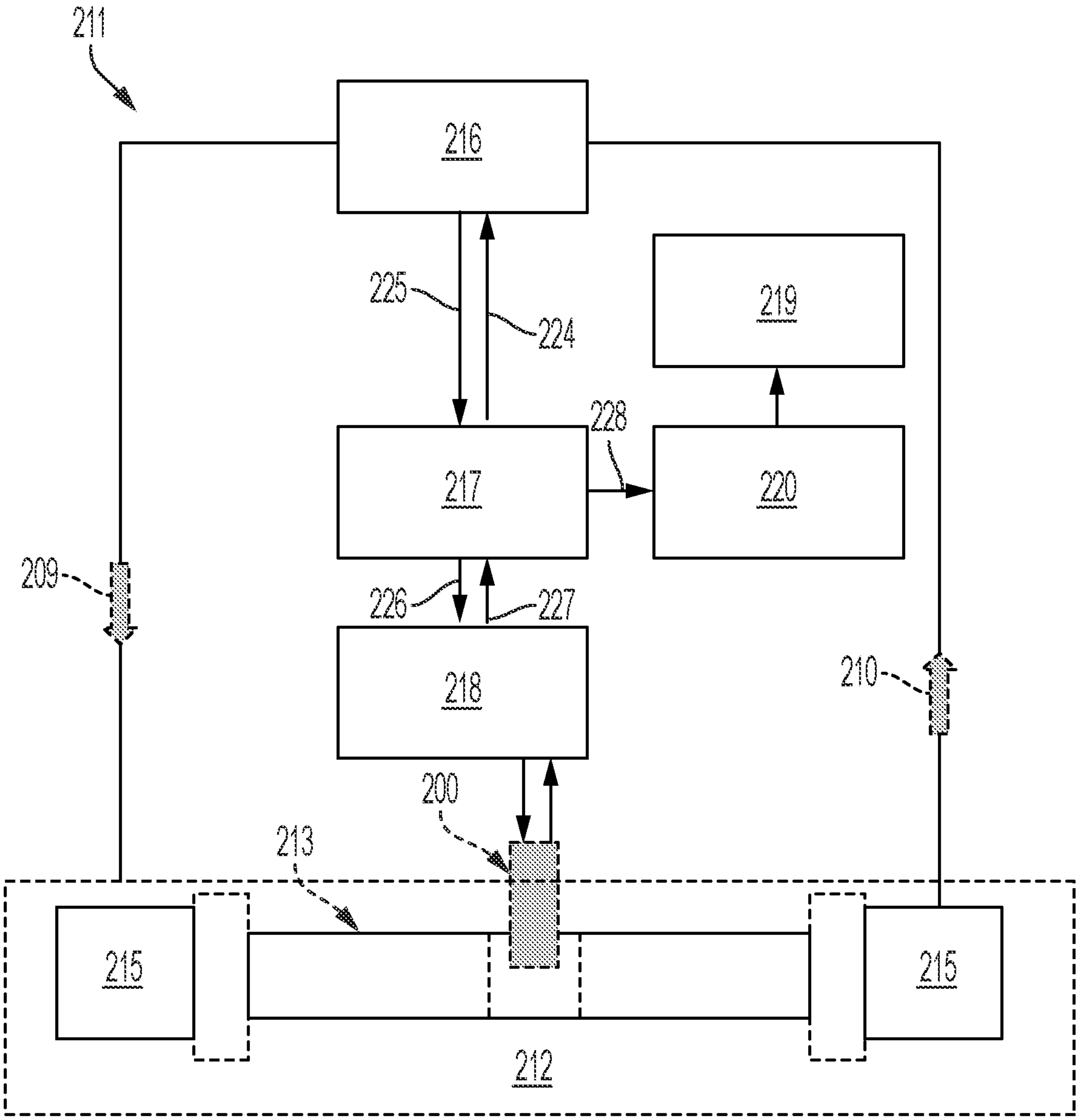
FIG. 5 shows a vapor transmission rate analyzer, according to some embodiments.
Figure 6:
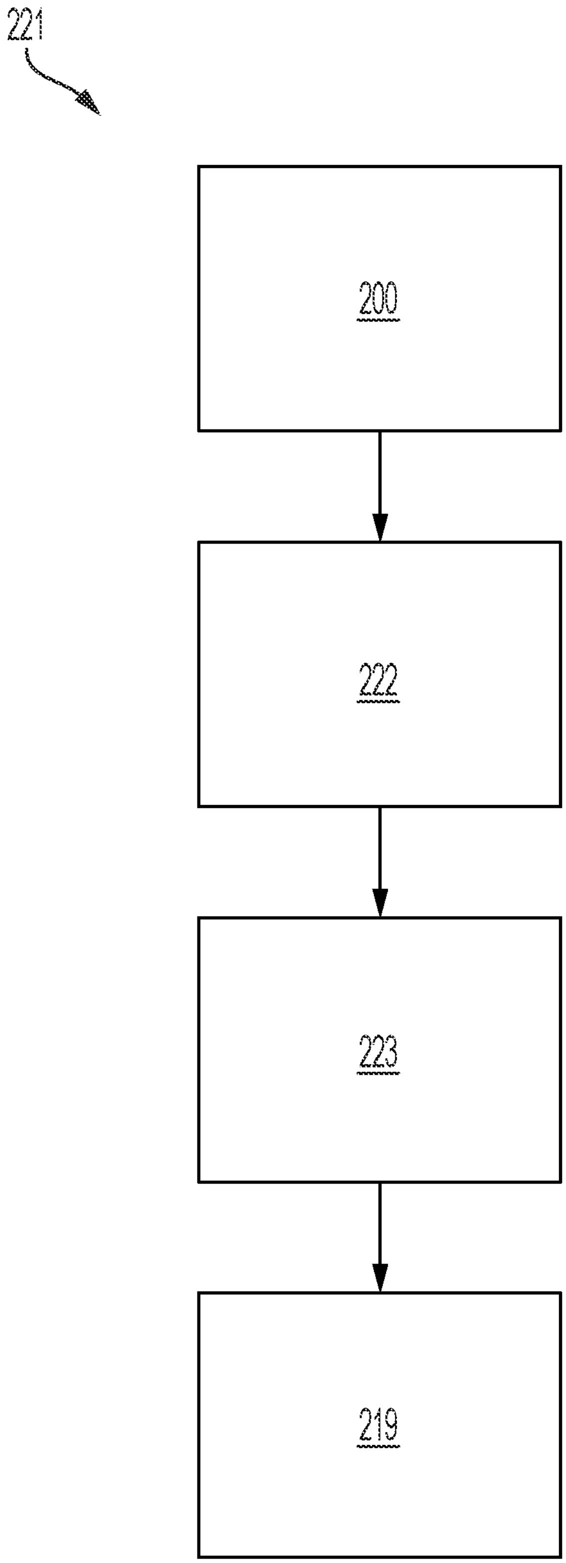
FIG. 6 shows a process for determining water vapor transmission rate, according to some embodiments.
Figure 7:
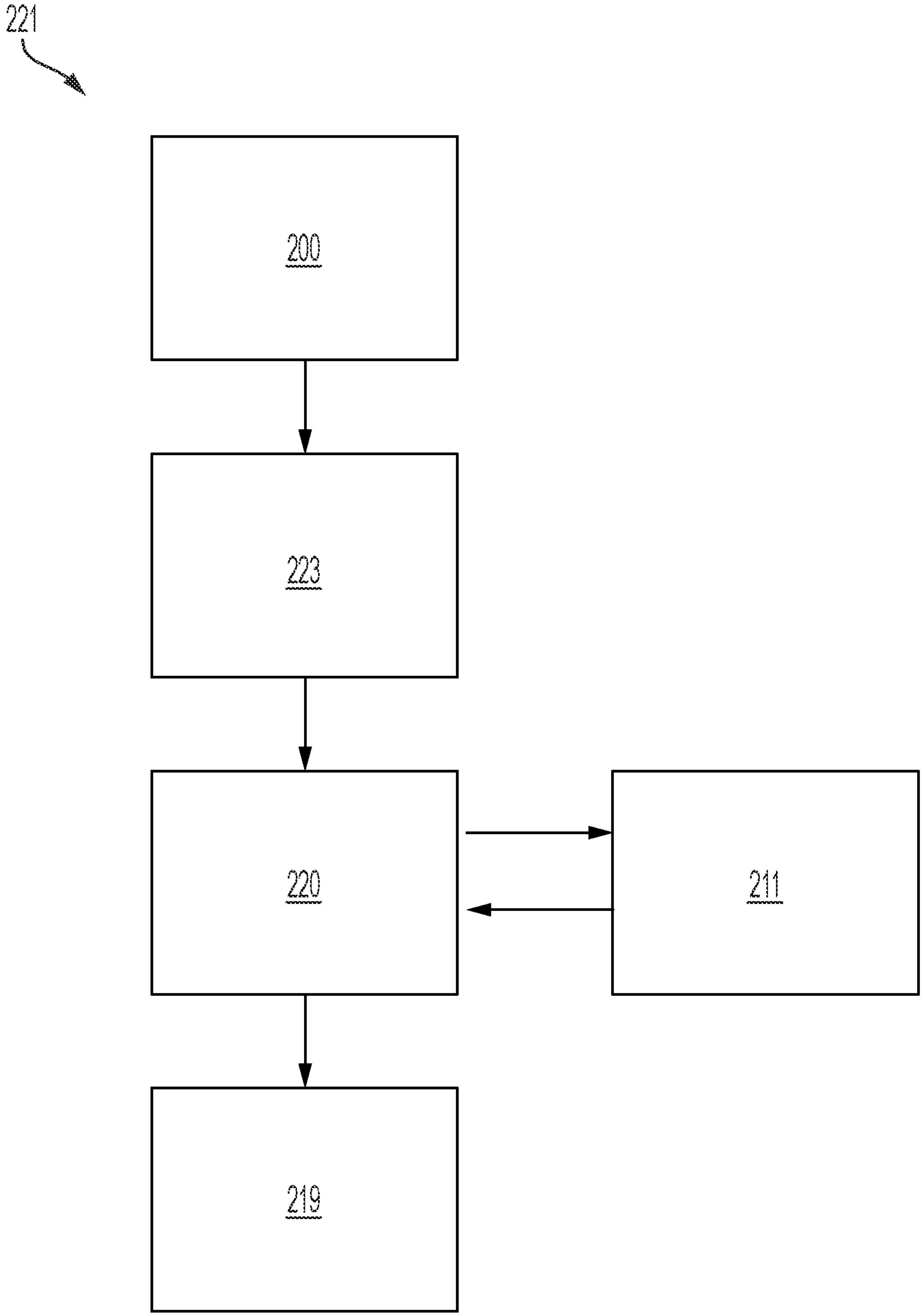
FIG. 7 shows a process for determining water vapor transmission rate, according to some embodiments.
Figure 9:
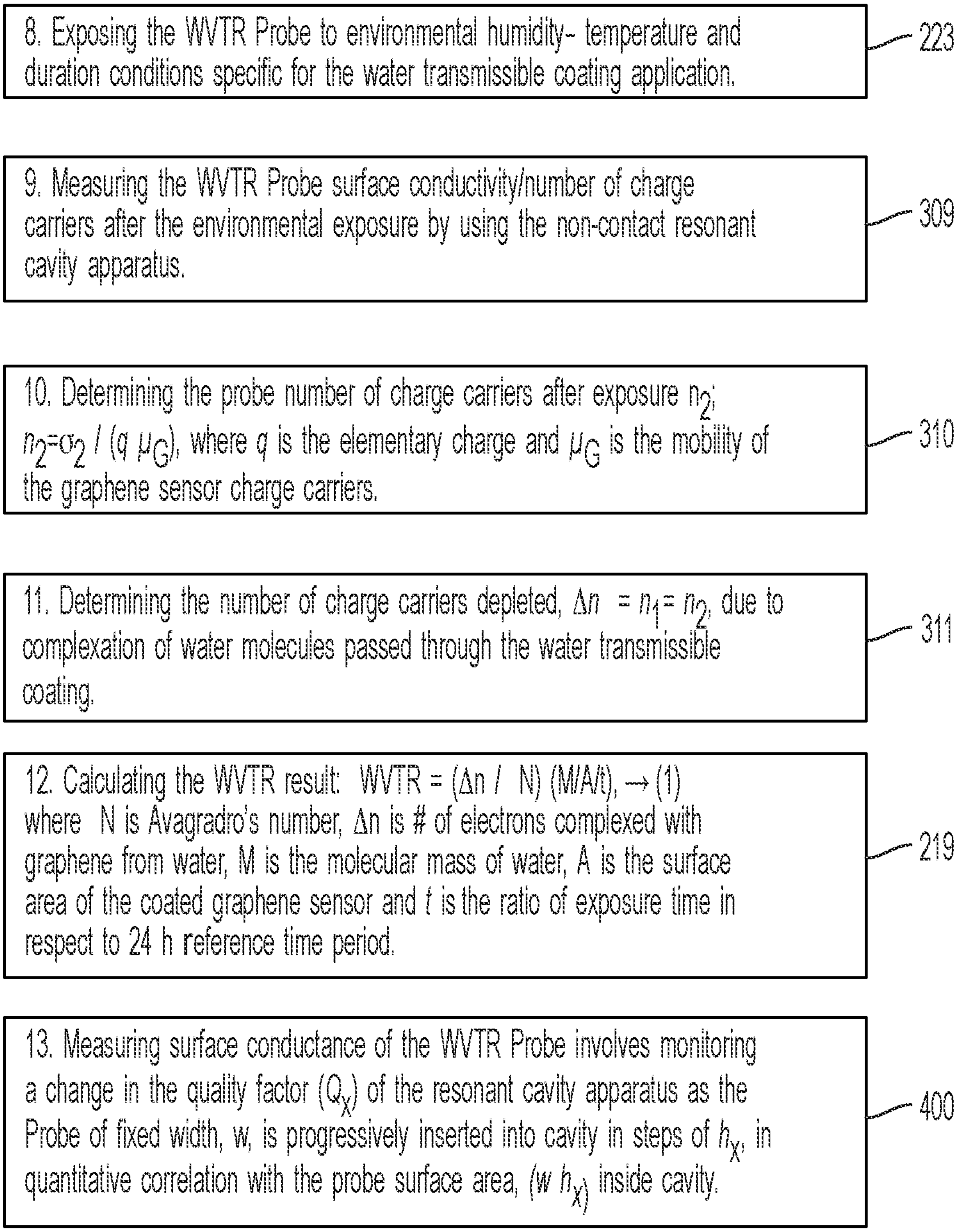
FIG. 9 steps in determining water vapor transmission rate, continued from FIG. 8, according to some embodiments.
Figure 12:
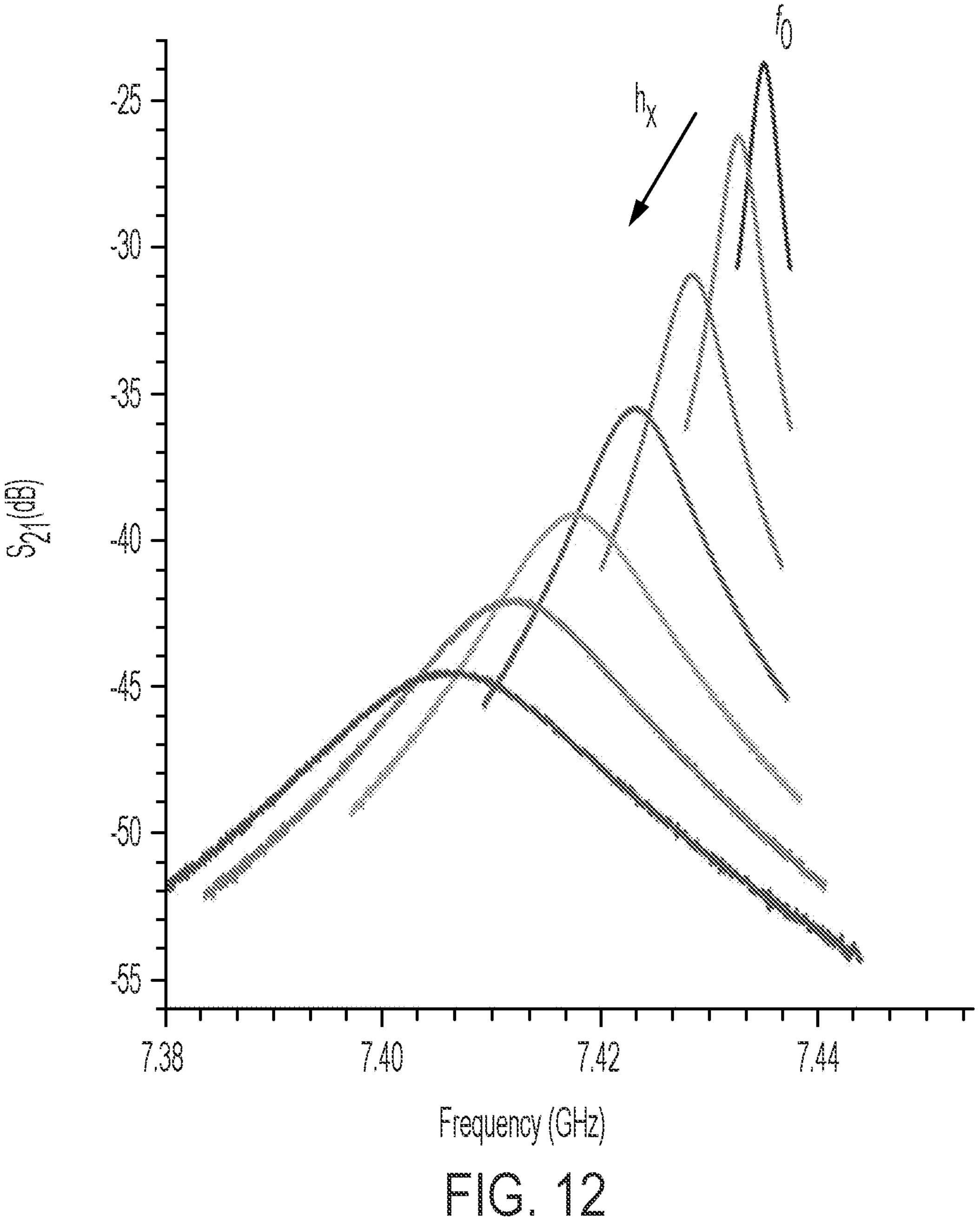
FIG. 12 shows a graph of microwave cavity intensity signal ($S_{21}$) at resonance measured at several probe insertions ($h_x$) in determining water vapor transmission rate, according to some embodiments.
Figure 13:
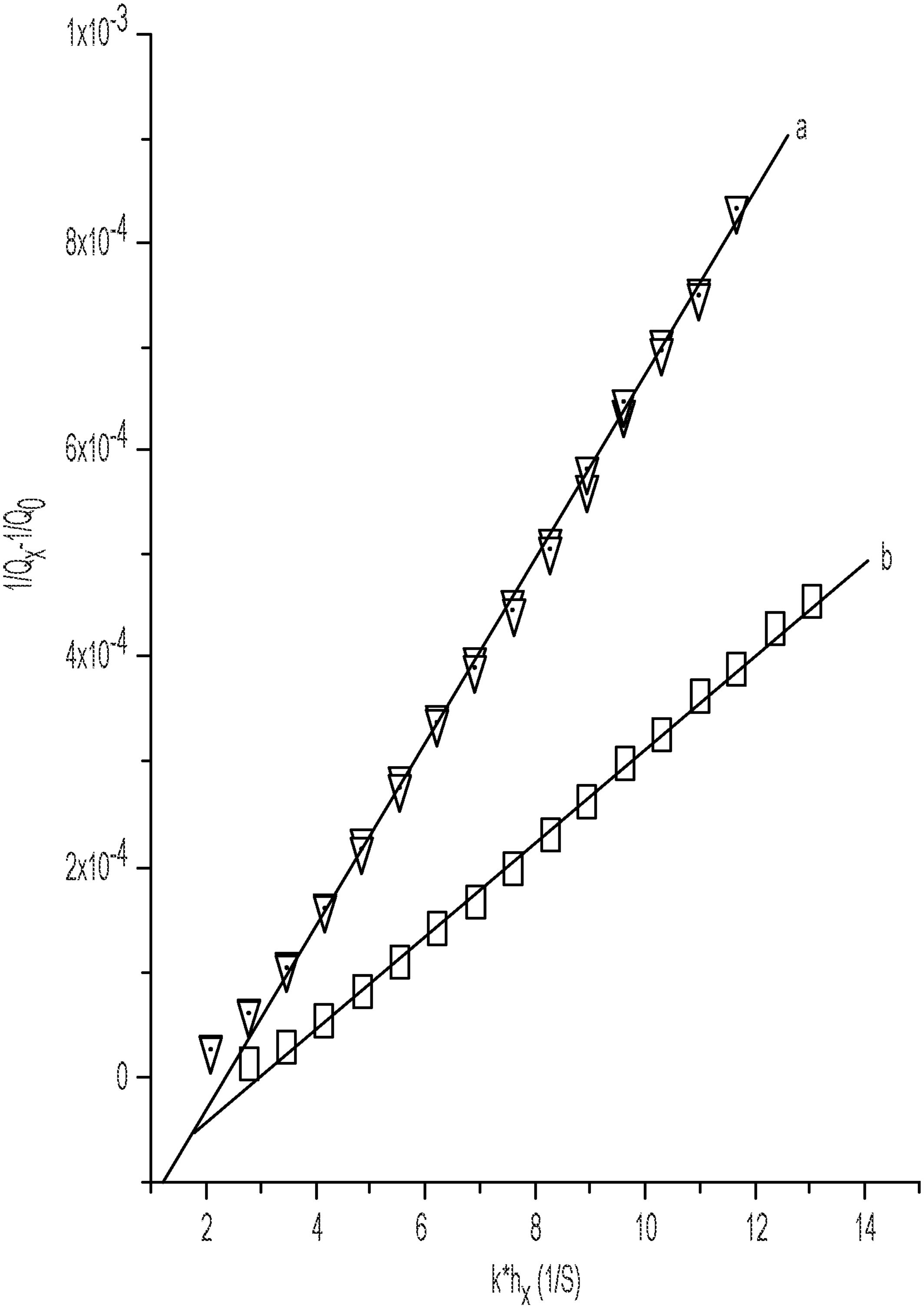
FIG. 13 shows a graph of microwave cavity quality factor that can be used in determining water vapor transmission rate, according to some embodiments.

In an embodiment, with reference to FIG. 4, microwave cavity 212 includes: a microwave waveguide 213 that receives the microwave frequency input signal 209, the analyte probe 200 via opening 229, communicates the microwave frequency input signal 209 to the analyte probe 200; receives the microwave frequency response signal 210 from the analyte probe 200; and communicates the ref a microwave frequency response signal 210 to an output microwave coupler 215; an input microwave coupler 215 that receives the microwave frequency input signal 209 from the microwave source 216 and communicates the microwave frequency input signal 209 to the microwave waveguide 213 via a first cavity wall 214; the first cavity wall 214 in communication with the input microwave coupler 215 and the microwave waveguide 213 and that receives the microwave frequency input signal 209 from the input microwave coupler 215 and communicates the microwave frequency input signal 209 to the microwave waveguide 213; a second cavity wall 214 opposing the first cavity wall 214 and in communication with the output microwave coupler 215 and the microwave waveguide 213 and that receives the microwave frequency response signal 210 from the microwave waveguide 213 and communicates the microwave frequency response signal 210 to the output microwave coupler 215; and the output microwave coupler 215 that receives the microwave frequency input signal 209 from the microwave waveguide 213 via the second cavity wall 214 and communicates the microwave frequency response signal 210 to the microwave source 216.

In an embodiment, control unit 217 produces and communicates a microwave control signal 224 to the microwave source 216 to control production of the microwave frequency input signal 209 by the microwave source 216. In en embodiment, microwave source 216 produces and communicates a microwave feedback signal 225 to the control unit 217, and the control unit 217 produces microwave data 228 from the microwave feedback signal 225 to produce the microwave data 228 from the microwave feedback signal 225.

Vapor transmission rate analyzer 211 can be made of various elements and components that are obtained from a vendor or fabricated, and elements of vapor transmission rate analyzer 211 can be various sizes that are made of a material that is physically or chemically resilient in an environment in which vapor transmission rate analyzer 211 is disposed. Exemplary materials include a metal, ceramic, thermoplastic, glass, semiconductor, and the like. Various elements of vapor transmission rate analyzer 211 can be made of the same or different material and can be monolithic in a single physical body or can be separate members that are physically joined.

In an embodiment, analyte 206 includes water although other analytes and substituents can be present in addition to the water or a difference chemical species other than water can be analyte 206. It is contemplated that analyte 206 is reversibly physisorbed to 1000° C. on graphene analysis layer 201, wherein analyte probe 200 is re-usable and can be rejuvenated for re-use after removal of analyte 206 from analytical interface 205.

In an embodiment, graphene analysis layer 201 is epitaxially grown graphene. Graphene can be grown on substrate 202 in various ways such as a single or several layers of graphene may be formed on a silicon carbide (SiC) substrate by sublimation decomposition of a surface layer of a silicon carbide material. Various growth process can be used to form the graphene of graphene analysis layer 201 such as processes described in the international patent application publication WO2012036608 and WO2009058865 (which also describe gas sensing based on graphene) and U.S. Pat. Nos. 9,150,417, 7,619,257, 7,015, 142, 8,460,764, and 8,076,204, the disclosure of each of which is incorporated by reference in its entirety.

In an embodiment, substrate 202 has an electrical conductivity that is 7 orders of magnitude less electrically conductive than graphene analysis layer 201. The substrate can be an electrical insulator a semiconductor material (e.g., SiC) with a very low electrical conductivity such as less than or equal to $10^{-9}$ S/m. In an embodiment, substrate 202 is silicon carbide.

Various elements of vapor transmission rate analyzer 211 such as components of microwave cavity 212, e.g., couplers, can be sourced from a vendor or can be custom-fabricated, as described in U.S. Pat. No. 10,261,032, which is incorporated by reference in its entirety.

The cavity waveguide can be made of copper material. The cavity can include a WR90 flange and shim with transvers electromagnetic (TEM) vectors turned 87 degrees in respect to each other. The flange-shim interface can be virtual magnetic impedance terminations (walls) enabling resonant operation with high quality factor (Q>3400) and stable resonant frequency, immune to environmental humidity conditions. The cavity can be connected to the microwave source and detector by a waveguide-to-coaxial coupling connection.

Vapor transmission rate analyzer 211 can be made in various ways. It should be appreciated that vapor transmission rate analyzer 211 includes a number of optical, electrical, or mechanical components, wherein such components can be interconnected and placed in communication (e.g., optical communication, electrical communication, mechanical communication, and the like) by physical, chemical, optical, or free-space interconnects. The components can be disposed on mounts that can be disposed on a bulkhead for alignment or physical compartmentalization. As a result, vapor transmission rate analyzer 211 can be disposed in a terrestrial environment or space environment. Elements of vapor transmission rate analyzer 211 can be formed from silicon, silicon nitride, and the like although other suitable materials, such ceramic, glass, or metal can be used. According to an embodiment, the elements of vapor transmission rate analyzer 211 are formed using 3D printing although the elements of vapor transmission rate analyzer 211 can be formed using other methods, such as injection molding or machining a stock material such as block of material that is subjected to removal of material such as by cutting, laser oblation, and the like. Accordingly, vapor transmission rate analyzer 211 can be made by additive or subtractive manufacturing. In an embodiment, elements of vapor transmission rate analyzer 211 are selectively etched to remove various different materials using different etchants and photolithographic masks and procedures. The various layers thus formed can be subjected to joining by bonding to form vapor transmission rate analyzer 211.

Analyte probe 200 has numerous advantageous and unexpected benefits and uses. In an embodiment, with reference FIG. 6, FIG. 7, FIG. 8, FIG. 9, FIG. 10, FIG. 11, FIG. 12, and FIG. 13, a process for determining water vapor transmission rate includes: receiving, by a microwave cavity 212 of a vapor transmission rate analyzer 211, an analyte probe 200, the analyte probe 200 including: a substrate 202 comprising a formation surface 208 for a forming a graphene analysis layer 201 on the substrate 202; a graphene analysis layer 201 disposed on the formation surface 208 of the substrate 202 and comprising an analytical interface 205 for receiving a test coating 204 and an n-dopant, such that: the substrate 202 and the graphene analysis layer 201 are arranged in an analyte sensor 203; the graphene analysis layer 201 is n-doped with the n-dopant so that the graphene analysis layer 201 communicates charge carriers in response to the analyte probe 200 being subjected to a microwave frequency input signal 209, and the communication of charge carriers by the graphene analysis layer 201 is directly proportional to an amount of analyte 206 disposed on the analytical interface 205; the graphene analysis layer 201 changes the microwave frequency input signal 209 to microwave frequency response signal 210 upon being subjected to the microwave frequency input signal 209, wherein the change from microwave frequency input signal 209 to microwave frequency response signal 210 is directly proportional to the amount of analyte 206 disposed on the analytical interface 205; the analytical interface 205 receives analyte 206 communicated through a test coating 204 disposed on the analytical interface 205; and the test coating 204 disposed on the analytical interface 205 of the graphene analysis layer 201 and comprising a probe surface 207, such that: the graphene analysis layer 201 is interposed between the substrate 202 and the test coating 204; and the probe surface 207 receives analyte 206; and the test coating 204 has a transmission rate of the analyte 206 through the test coating 204 from the probe surface 207 to the analytical interface 205 that is determinable from the microwave frequency input signal 209 and the microwave frequency response signal 210 from the graphene analysis layer 201; subjecting the analyte probe 200 to microwave frequency input signal 209; producing, by the analyte probe 200, microwave frequency response signal 210 from the microwave frequency input signal 209; and analyzing the microwave frequency response signal 210 relative to the microwave frequency input signal 209 to determine the water vapor transmission rate 219 of the test coating 204 of the analyte probe 200.

In an embodiment, determining water vapor transmission rate. includes changing a portion of the analyte probe 200 subjected to the microwave frequency input signal 209 in the microwave cavity 212 by changing a position of the analyte probe 200 in the microwave cavity 212.

In an embodiment, determining water vapor transmission rate. includes: forming the graphene analysis layer 201 on the substrate 202 by epitaxial growth of graphene on the substrate 202; and forming the test coating 204 on the analytical interface 205 of the graphene analysis layer 201.

The processes described herein may be embodied in, and fully automated via, software code modules executed by a computing system that includes one or more general purpose computers or processors. The code modules may be stored in any type of non-transitory computer-readable medium or other computer storage device. Some or all the methods may alternatively be embodied in specialized computer hardware. In addition, the components referred to herein may be implemented in hardware, software, firmware, or a combination thereof.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

Any logical blocks, modules, and algorithm elements described or used in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described or used in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix (s) as used herein is intended to include both the singular and the plural of the term that it modifies, thereby including at least one of that term (e.g., the colorant(s) includes at least one colorants). Option, optional, or optionally means that the subsequently described event or circumstance can or cannot occur, and that the description includes instances where the event occurs and instances where it does not. As used herein, combination is inclusive of blends, mixtures, alloys, reaction products, collection of elements, and the like.

As used herein, a combination thereof refers to a combination comprising at least one of the named constituents, components, compounds, or elements, optionally together with one or more of the same class of constituents, components, compounds, or elements.

All references are incorporated herein by reference.

The use of the terms "a," "an," and "the" and similar referents in the context of describing the invention (especially in the context of the following claims) are to be construed to cover both the singular and the plural, unless otherwise indicated herein or clearly contradicted by context. It can further be noted that the terms first, second, primary, secondary, and the like herein do not denote any order, quantity, or importance, but rather are used to distinguish one element from another. It will also be understood that, although the terms first, second, etc. are, in some instances, used herein to describe various elements, these elements should not be limited by these terms. For example, a first current could be termed a second current, and, similarly, a second current could be termed a first current, without departing from the scope of the various described embodiments. The first current and the second current are both currents, but they are not the same condition unless explicitly stated as such.

The modifier about used in connection with a quantity is inclusive of the stated value and has the meaning dictated by the context (e.g., it includes the degree of error associated with measurement of the particular quantity). The conjunction or is used to link objects of a list or alternatives and is not disjunctive; rather the elements can be used separately or can be combined together under appropriate circumstances.

What is claimed is:

1. An analyte probe for determining water vapor transmission rate, the analyte probe comprising: a substrate comprising a formation surface for forming a graphene analysis layer on the substrate; a graphene analysis layer disposed on the formation surface of the substrate and comprising an analytical interface for receiving a test coating and an n-dopant, such that: the substrate and the graphene analysis layer are arranged in an analyte sensor, wherein the analyte sensor comprises the substrate and the graphene analysis layer; the graphene analysis layer is n-doped with the n-dopant so that the graphene analysis layer communicates charge carriers in response to the analyte probe being subjected to a microwave frequency input signal, and the communication of charge carriers by the graphene analysis layer is directly proportional to an amount of analyte disposed on the analytical interface; the graphene analysis layer changes the microwave frequency input signal to a microwave frequency response signal upon being subjected to the microwave frequency input signal, wherein the change from the microwave frequency input signal to the microwave frequency response signal is directly proportional to the amount of an analyte disposed on the analytical interface; the analytical interface receives the analyte communicated through a test coating disposed on the analytical interface; and the test coating disposed on the analytical interface of the graphene analysis layer and comprising a probe surface, such that: the graphene analysis layer is interposed between the substrate and the test coating; the probe surface receives the analyte; and the test coating has a transmission rate of the analyte through the test coating from the probe surface to the analytical interface that is determinable from the microwave frequency input signal and the microwave frequency response signal from the graphene analysis layer, wherein the analyte is reversibly physisorbed to 1000° C. on the graphene analysis layer.

2. The analyte probe of claim 1, wherein the analyte comprises water.

3. The analyte probe of claim 1, wherein the graphene analysis layer is epitaxially grown graphene.

4. An analyte probe for determining water vapor transmission rate, the analyte probe comprising: a substrate comprising a formation surface for forming a graphene analysis layer on the substrate; a graphene analysis layer disposed on the formation surface of the substrate and comprising an analytical interface for receiving a test coating and an n-dopant, such that: the substrate and the graphene analysis layer are arranged in an analyte sensor, wherein the analyte sensor comprises the substrate and the graphene analysis layer; the graphene analysis layer is n-doped with the n-dopant so that the graphene analysis layer communicates charge carriers in response to the analyte probe being subjected to a microwave frequency input signal, and the communication of charge carriers by the graphene analysis layer is directly proportional to an amount of analyte disposed on the analytical interface; the graphene analysis layer changes the microwave frequency input signal to a microwave frequency response signal upon being subjected to the microwave frequency input signal, wherein the change from the microwave frequency input signal to the microwave frequency response signal is directly proportional to the amount of an analyte disposed on the analytical interface; the analytical interface receives the analyte communicated through a test coating disposed on the analytical interface; and the test coating disposed on the analytical interface of the graphene analysis layer and comprising a probe surface, such that: the graphene analysis layer is interposed between the substrate and the test coating: the probe surface receives the analyte; and the test coating has a transmission rate of the analyte through the test coating from the probe surface to the analytical interface that is determinable from the microwave frequency input signal and the microwave frequency response signal from the graphene analysis layer, wherein the substrate comprises an electrical conductivity that is 7 orders of magnitude less electrically conductive than the graphene analysis layer.

5. The analyte probe of claim 1, wherein the substrate comprises silicon carbide.

6. A vapor transmission rate analyzer for determining water vapor transmission rate, the vapor transmission rate analyzer comprising: a microwave cavity that receives an analyte probe; the analyte probe comprising: a substrate comprising a formation surface for a forming a graphene analysis layer on the substrate; a graphene analysis layer disposed on the formation surface of the substrate and comprising an analytical interface for receiving a test coating and an n-dopant, such that: the substrate and the graphene analysis layer are arranged in an analyte sensor, wherein the analyte sensor comprises the substrate and the graphene analysis layer; the graphene analysis layer is n-doped with the n-dopant so that the graphene analysis layer communicates charge carriers in response to the analyte probe being subjected to a microwave frequency input signal, and the communication of charge carriers by the graphene analysis layer is directly proportional to an amount of analyte disposed on the analytical interface; the graphene analysis layer changes the microwave frequency input signal to microwave frequency response signal upon being subjected to the microwave frequency input signal, wherein the change from microwave frequency input signal to microwave frequency response signal is directly proportional to the amount of analyte disposed on the analytical interface; the analytical interface receives analyte communicated through a test coating disposed on the analytical interface; and the test coating disposed on the analytical interface of the graphene analysis layer and comprising a probe surface, such that: the graphene analysis layer is interposed between the substrate and the test coating; the probe surface receives analyte; and the test coating has a transmission rate of the analyte through the test coating from the probe surface to the analytical interface that is determinable from the microwave frequency input signal and the microwave frequency response signal from the graphene analysis layer; a microwave source in communication with the microwave cavity and that produces microwave frequency input signal and communicates the microwave frequency input signal to the microwave cavity and receives the microwave frequency response signal from the microwave cavity; a control unit in communication with the microwave source, a positioner, and an analyzer, such that the control unit: controls production of microwave frequency input signal by the microwave source; controls movement of positioner; produces microwave data from microwave feedback signal received from the microwave source; and communicates microwave data to the analyzer; the positioner in communication with the control unit and the analyte probe, such that the positioner moves the analyte probe relative to the microwave cavity and adjusts the position of the analyte probe in a microwave waveguide of the microwave cavity so that a selected portion of the analyte probe is subjected to the microwave frequency input signal and produces the microwave frequency response signal from the microwave frequency input signal in the microwave waveguide; and the analyzer in communication with the control unit and that receives the microwave data from the control unit and produces a water vapor transmission rate from analysis of the microwave data, wherein the microwave cavity comprises:

a microwave waveguide that receives the microwave frequency input signal, the analyte probe via opening, communicates the microwave frequency input signal to the analyte probe; receives the microwave frequency response signal from the analyte probe; and communicates the ref a microwave frequency response signal to an output microwave coupler;

an input microwave coupler that receives the microwave frequency input signal from the microwave source and communicates the microwave frequency input signal to the microwave waveguide via a first cavity wall;

the first cavity wall in communication with the input microwave coupler and the microwave waveguide and that receives the microwave frequency input signal from the input microwave coupler and communicates the microwave frequency input signal to the microwave waveguide;

a second cavity wall opposing the first cavity wall and in communication with the output microwave coupler and the microwave waveguide and that receives the microwave frequency response signal from the microwave waveguide and communicates the microwave frequency response signal to the output microwave coupler; and the output microwave coupler that receives the microwave frequency input signal from the microwave waveguide via the second cavity wall and communicates the microwave frequency response signal to the microwave source.

7. The vapor transmission rate analyzer of claim 6, wherein the control unit produces and communicates a microwave control signal to the microwave source to control production of the microwave frequency input signal by the microwave source.

8. The vapor transmission rate analyzer of claim 6, wherein the microwave source produces and communicates a microwave feedback signal to the control unit, and the control unit produces microwave data from the microwave feedback signal to produce the microwave data from the microwave feedback signal.

9. The vapor transmission rate analyzer of claim 6, wherein the analyte comprises water.

10. The vapor transmission rate analyzer of claim 6, wherein the analyte is reversibly physisorbed to 1000° C. on the graphene analysis layer.

11. The vapor transmission rate analyzer of claim 6, wherein the graphene analysis layer is epitaxially grown graphene.

12. The vapor transmission rate analyzer of claim 6, wherein the substrate comprises silicon carbide.

13. A vapor transmission rate analyzer for determining water vapor transmission rate, the vapor transmission rate analyzer comprising: a microwave cavity that receives an analyte probe; the analyte probe comprising: a substrate comprising a formation surface for a forming a graphene analysis layer on the substrate; a graphene analysis layer disposed on the formation surface of the substrate and comprising an analytical interface for receiving a test coating and an n-dopant, such that: the substrate and the graphene analysis layer are arranged in an analyte sensor, wherein the analyte sensor comprises the substrate and the graphene analysis layer; the graphene analysis layer is n-doped with the n-dopant so that the graphene analysis layer communicates charge carriers in response to the analyte probe being subjected to a microwave frequency input signal, and the communication of charge carriers by the graphene analysis layer is directly proportional to an amount of analyte disposed on the analytical interface; the graphene analysis layer changes the microwave frequency input signal to microwave frequency response signal upon being subjected to the microwave frequency input signal, wherein the change from microwave frequency input signal to microwave frequency response signal is directly proportional to the amount of analyte disposed on the analytical interface; the analytical interface receives analyte communicated through a test coating disposed on the analytical interface; and the test coating disposed on the analytical interface of the graphene analysis layer and comprising a probe surface, such that: the graphene analysis layer is interposed between the substrate and the test coating; the probe surface receives analyte; and the test coating has a transmission rate of the analyte through the test coating from the probe surface to the analytical interface that is determinable from the microwave frequency input signal and the microwave frequency response signal from the graphene analysis layer; a microwave source in communication with the microwave cavity and that produces microwave frequency input signal and communicates the microwave frequency input signal to the microwave cavity and receives the microwave frequency response signal from the microwave cavity; a control unit in communication with the microwave source, a positioner, and an analyzer, such that the control unit: controls production of microwave frequency input signal by the microwave source; controls movement of positioner; produces microwave data from microwave feedback signal received from the microwave source; and communicates microwave data to the analyzer; the positioner in communication with the control unit and the analyte probe, such that the positioner moves the analyte probe relative to the microwave cavity and adjusts the position of the analyte probe in a microwave waveguide of the microwave cavity so that a selected portion of the analyte probe is subjected to the microwave frequency input signal and produces the microwave frequency response signal from the microwave frequency input signal in the microwave waveguide; and the analyzer in communication with the control unit and that receives the microwave data from the control unit and produces a water vapor transmission rate from analysis of the microwave data, wherein the substrate comprises an electrical conductivity that is 7 orders of magnitude less electrically conductive than the graphene analysis layer.

* * * * *